United States Patent [19]

Miyagawa

[11] Patent Number: 5,533,101
[45] Date of Patent: Jul. 2, 1996

[54] EXTENSION PHONE TYPE CORDLESS TELEPHONE SET

[75] Inventor: Shozo Miyagawa, Kyoto, Japan

[73] Assignee: Rohm Co. Ltd., Kyoto, Japan

[21] Appl. No.: 281,696

[22] Filed: Jul. 28, 1994

[30]  Foreign Application Priority Data

Jul. 28, 1993 [JP] Japan ................................ 5-186126

[51] Int. Cl.⁶ .................................................. H04M 11/00
[52] U.S. Cl. .............................................. 379/61; 379/66
[58] Field of Search .............................. 379/58, 61, 64, 379/66

[56]  References Cited

U.S. PATENT DOCUMENTS 5,073,928 12/1991 Shimanuki ............................ 379/61 X
5,315,639 5/1994 Lassers .................................. 379/66

*Primary Examiner*—Curtis Kuntz
*Assistant Examiner*—G. J. Oehling
*Attorney, Agent, or Firm*—Fish & Richardson

[57]  ABSTRACT

An extension phone type cordless telephone comprises a terminating set, a plurality of branch sets, and a plurality of charger stands. The terminating set comprises a terminating set radio communication circuit for performing radio communication with the plurality of branch sets and a terminating set wire communication circuit for performing communication over a commercial power line with the branch sets via a stand wire communication circuit included in the charger stand.

6 Claims, 4 Drawing Sheets

EXTENSION PHONE TYPE CORDLESS TELEPHONE SET

BACKGROUND OF INVENTION

1. Field of the Invention

The present invention relates generally to a telephone set and, more particularly, to an extension phone type cordless telephone allowing radio communication between its terminating set and branch sets.

2. Description of the Related Arts

Most recent developed domestic telephones, for example, are becoming fitted with diverse functions for convenience, amongst which a so-called cordless telephone is rapidly gaining popularity. The cordless telephone set is not fitted with a telephone cord which connects a telephone set body (hereinafter, referred to as a terminating set) associated with a telephone line to a receiver (or a handset). The rapid prevalence of the cordless telephone may have resulted from the telephone user's enlarged action area during a call.

The cordless telephone set can be merely a single terminating set, or a so-called extension phone consisting of a terminating set to which a telephone line is connected and one or more branch sets to which telephone lines are not directly connected.

The former of the cordless telephones generally had the terminating set and a handset separately provided with their respective radio communication circuits, thereby enabling the outside line call to be carried out. The latter of the cordless telephones, that is, the extension type phone, has the terminating set and one or more branch sets separately provided with their respective radio communication circuits, whereby the branch sets are connected to the telephone line of the terminating set through radio communication to allow the branch sets to effect an outside line call, or whereby an extension call can be effected between the terminating set and the branch set through a radio communication, in addition to the outside line call by use of the terminating set.

In the case of such conventional extension phone type cordless telephones having a plurality of branch sets, there may sometimes arise the occasion, while a branch set is in service for an outside call, of wanting to effect an extension call between the terminating set and the other branch set, or while an extension call is busy between a branch set and the terminating set, to effect an outside call by another branch set. In either case, however, the radio communication circuit is inconveniently occupied by the outside line call or the extension call which has priority, so that the other branch set can not effect either an extension call or an outside line call until the completion of such a priority call.

Although it may be conceivable to provide the terminating set with a plurality of radio communication circuits, the radio communication circuit is generally expensive, and the dimensions of the terminating set will be increased if such are provided.

SUMMARY OF THE INVENTION

The present invention was conceived to overcome the above problems, and an which object of the inventor is to provide a cordless telephone set having a plurality of branch sets capable of effecting simultaneous communication, at a relatively low production cost and without increasing the dimensions of its terminating set.

According to one aspect of the present invention in order to achieve the above object, there is provided an extension phone type cordless telephone comprising a terminating set operative through a commercial power line acting as a power source and a plurality of branch sets capable of being connected to a plurality of stands correspondingly associated therewith and operated by a power source in the form of a commercial power line, for effecting radio communication between the terminating set and one of the plurality of branch sets; the terminating set including a terminating set radio communication circuit for effecting radio communication with one of the branch sets, and a terminating set wire communication circuit for effecting wire communication with one of the branch sets by use of a high-frequency signal superposed on the commercial power line acting as a communication path; the plurality of stands each including a branch set connecting portion for transmitting and receiving a transmission/reception signal, a control signal and so on to and from the branch set to be coupled, and a stand wire communication circuit for effecting a communication by use of a high-frequency signal superposed on the commercial power line acting as a communication path; the plurality of branch sets each including a branch set radio communication circuit for effecting communication with the terminating set, and a stand connecting portion for the connection with the stand.

To summarize, in the case where the branch set is coupled to the stand, the wire communication circuits separately provided on the terminating set and the stand besides the radio communication circuits are used to effect a wire communication between the terminating set and the branch set coupled to the stand by use of a high-frequency signal superposed on the commercial power line. Accordingly, even though the radio communication circuit of the terminating set is occupied by one branch set, the present invention allows an extension call between the other branch set and the terminating set as well as an outside line call from the other branch set to be performed. It is thus possible to effect simultaneous communication by use of a plurality of branch sets without providing the terminating set with expensive radio communication circuits whose number coincides with that of the branch sets and without increasing the size thereof, thus resulting in the provision of an inexpensive cordless telephone set.

According to another aspect of the present invention, each of the branch sets further includes a connection detector for detecting whether the branch set has been mounted on the stand associated therewith or not, and a circuit switching means for changing over, based on the detection result of the connection detector, from a communication path through the branch set radio communication circuit of the branch set to a communication path through the stand wire communication circuit within the stand, and vice versa.

In short, upon detecting that one branch set has been coupled to the stand, the communication path can be automatically changed over from the radio communication path to the wire communication path and vice versa. This will eliminate the necessity of the user manually and inconveniently changing over from the radio communication mode to the wire communication mode and vice versa, which will lead to an improved operability.

According to a further aspect of the present invention, the stand includes a branch set mount, and the branch set is mounted on the mount of the stand for the direct connection between the branch set connecting portion and the stand connecting portion.

According to a still further aspect of the present invention, the branch set connecting portion is connected to the stand connecting portion by way of a connector cable having a connector.

It is thus possible to establish an easy and secure connection between the branch set and the stand to ensure satisfactory wire communication.

DESCRIPTION OF THE PREFERRED EMBODIMENTS

Exemplary embodiments of the present invention will now be described in more detail with reference to the accompanying drawings.

Figure 1:
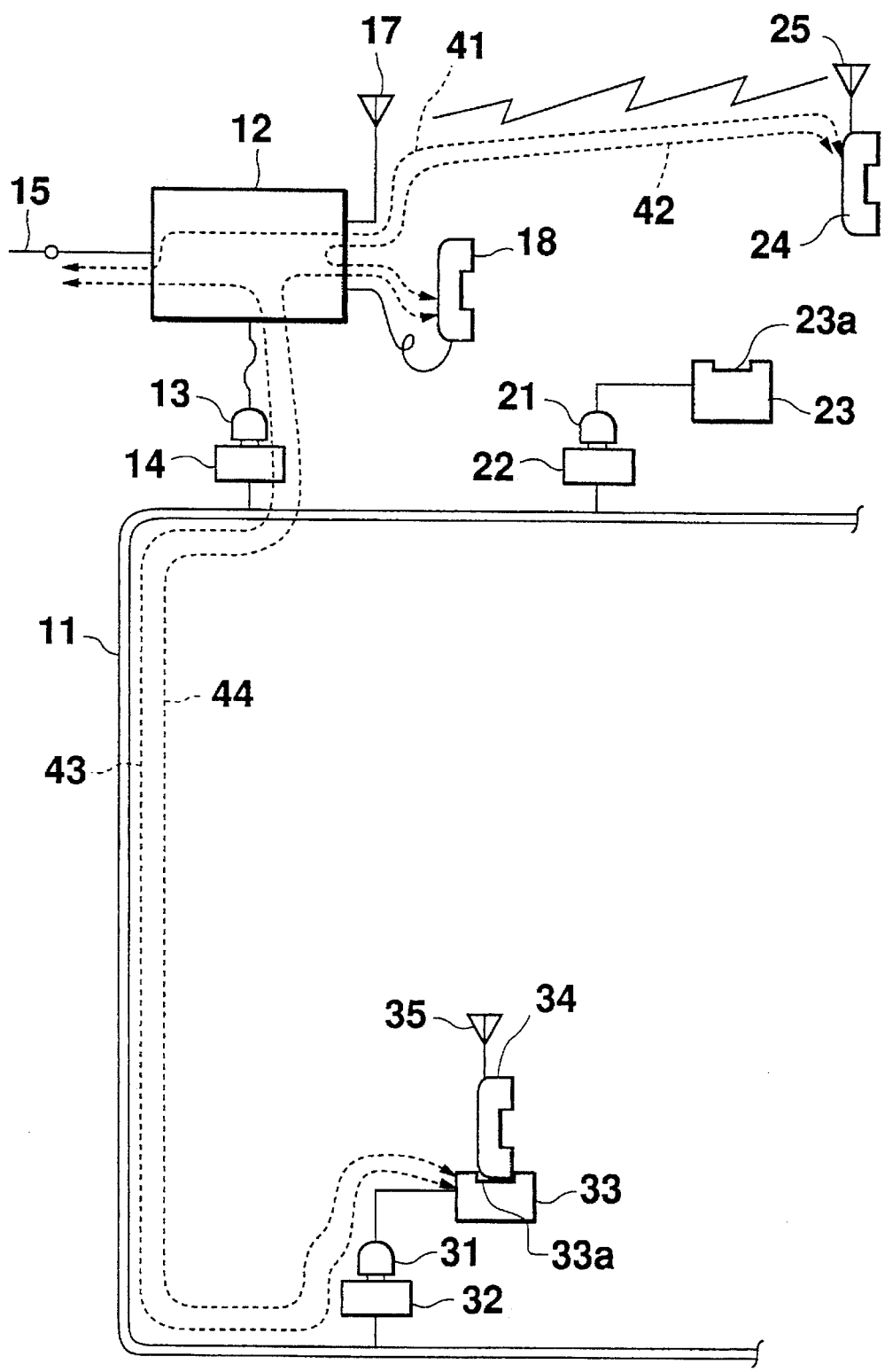
FIG. 1 is a block diagram showing the entire configuration of an extension phone type cordless telephone set in accordance with an embodiment of the present invention.

FIG. 1 depicts the entire configuration of an extension phone-type cordless telephone set (hereinafter referred to simply as a cordless telephone type) in accordance with an embodiment of the present invention. As is apparent from this diagram, used as a commercial power line is, for example, a interior wire 11 having an outlet 14 to which a terminating set 12 is connected by way of a power cord plug 13 and having an outlet 22 which receives a power cord plug 21 associated with a stand 23 for a branch set 24. The interior wire 11 further has an outlet 32 intended to receive a power cord plug 31 associated with a stand 33 for another branch set 34.

The terminating set 12 is connected to a telephone line 15 and includes an antenna 17 for radio communication, a handset 18, and an internal circuit such as a radio communication circuit for a terminating set which will be described later. The branch sets 24 and 34 which are operated by batteries include antennas 25 and 35 for radio communication, respectively, and an internal circuit such as a radio communication circuit for a branch set. The stands 23 and 33 acting as chargers include mounts 23a and 33a, respectively, bearing the branch sets 24 and 34, respectively, so as to allow the batteries incorporated in these branch sets to be charged when they are placed thereon.

When the branch set 24 is dismounted from the stand 23, the terminating set 12 is capable of effecting radio communication with the branch set 24 to allow an outside line service through the branch set 24 along a path indicated by a dotted line 41. It is also possible to effect an extension service between the terminating set 12 and the branch set 24 along a path indicated by a dotted line 42. The same can be said of the relationship between the terminating set 12 and the branch set 34.

The present invention is characterized in that when a branch set is coupled to the stand the interior wire 11 which is a commercial power line serves as a speech path to enable wire communication between the branch set and the terminating set. More specifically, when the branch set 34 is mounted on the stand 33 as shown, for example, it is possible to effect both an outside service along a path indicated by a dotted line 43 and an extension service along a path indicated by a dotted line 44. The detail of such action will be described hereinbelow with reference to FIGS. 2 and 3.

Figure 2:
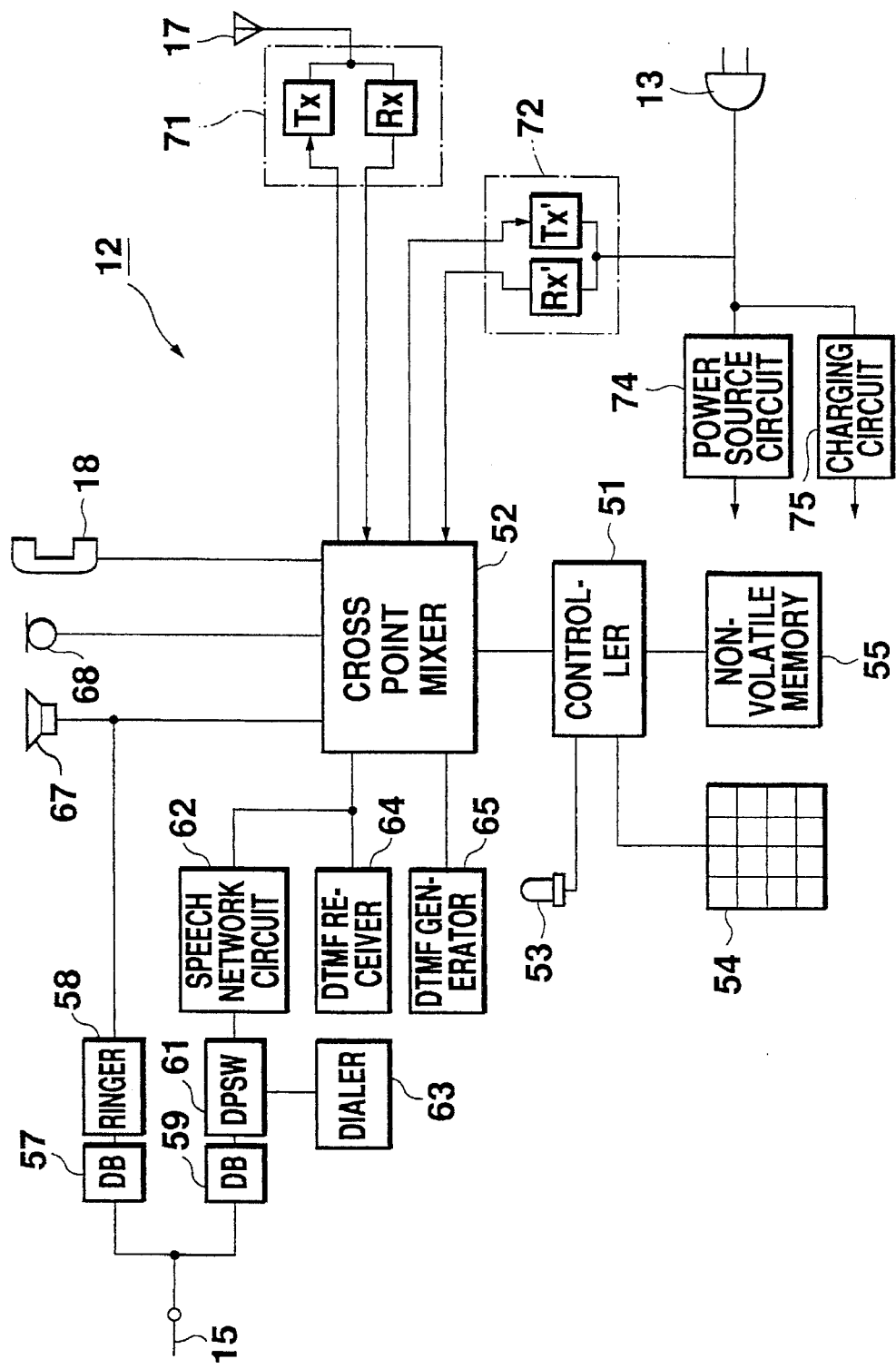
FIG. 2 is a block diagram showing in detail the internal configuration of a terminating set of the extension phone type cordless telephone set depicted in FIG. 1.

FIG. 2 depicts the internal configuration of the terminating set 12 in detail. The terminating set 12 comprises a controller 51 for overall controlling the apparatus. The controller 51 is associated with a cross point mixer 52, a keyboard 54 for dialing input, an indicator 53 for indicating diverse states including that the outside line or the extension is busy, and a nonvolatile memory 55 for storing an ID code shared with a plurality of branch sets, individual ID codes for each of the branch sets, abbrebiated dialings and so on.

Coupled to the cross point mixer 52 are a speech network 62, a DTMF (Dual Tone Multi-Frequency) receiver 64 and a DTMF generator 65 for respectively receiving and generating DTMF signals, a built-in speaker 67, a built-in microphone 68, and a handset 18.

The speech network is coupled to a dial pulse switching circuit (DPSW) 61 associated with a dialer 63, the DPSW 61 being in turn connected through a diode bridge circuit (DB) 59 to a telephone line 15. The DPSW 61 interrupts the telephone line in response to dial signals transmitted from the dialer 63 to thereby provide dial pulses.

A ringer 58 is also connected by way of another DB 57 to the telephone line 15 so as to activate the built-in speaker 67 in response to calling from the telephone line. In cooperation with the built-in microphone 68, this built-in speaker 67 is also used for a call under the state where the handset 18 rests on the hook.

Further coupled to the cross point mixer 52 is a radio communication circuit 71 for the terminating set comprising a transmitting circuit Tx and a receiving circuit Rx, thereby ensuring radio communication with other branch sets by way of the antenna 17. The transmitting circuit Tx includes a compressor for compressing transmission data, a scrambler for encoding thus compressed data, and a band-pass filter, whereas the receiving circuit Rx includes an expander for expanding received data, a descrambler for decoding the received data, and a band-pass filter.

Further hooked up to the cross point mixer 52 is a wire communication circuit 72 for the terminating set comprising a transmitting circuit Tx' and a receiving circuit Rx' in order to ensure a wire communication with other branch sets by way of the power code plug 13 and the interior interior wire 11. This will constitute one of the features of the present invention. Such a wire communication circuit capable of communicating by use of high-frequency signals superposed on the interior wire has been provided in the form of a communication modular chip (commonly known as FM intercom, for example, an IC for industrial units manufactured by Rohm Co. Ltd: BA 1602L, etc.) which is easily applicable to this embodiment.

The cross point mixer 52 serves as a switching unit which selectively switches from the extension call mode to the outside line call mode and vice versa through the radio communication circuit 71 for the terminating set and which selectively switches a call mode between the extension and the outside line through the wire communication circuit 72 for the terminating set.

The power code plug 13 coupled to the outlet 14 of the interior wire 11 (FIG. 1) is further connected to a power source circuit 74 for generating a direct current voltage necessary for the actions of the entire apparatus as well as a charging circuit 75 for charging batteries not shown, thus allowing the direct current voltage to be applied to the respective circuits.

Figure 3:
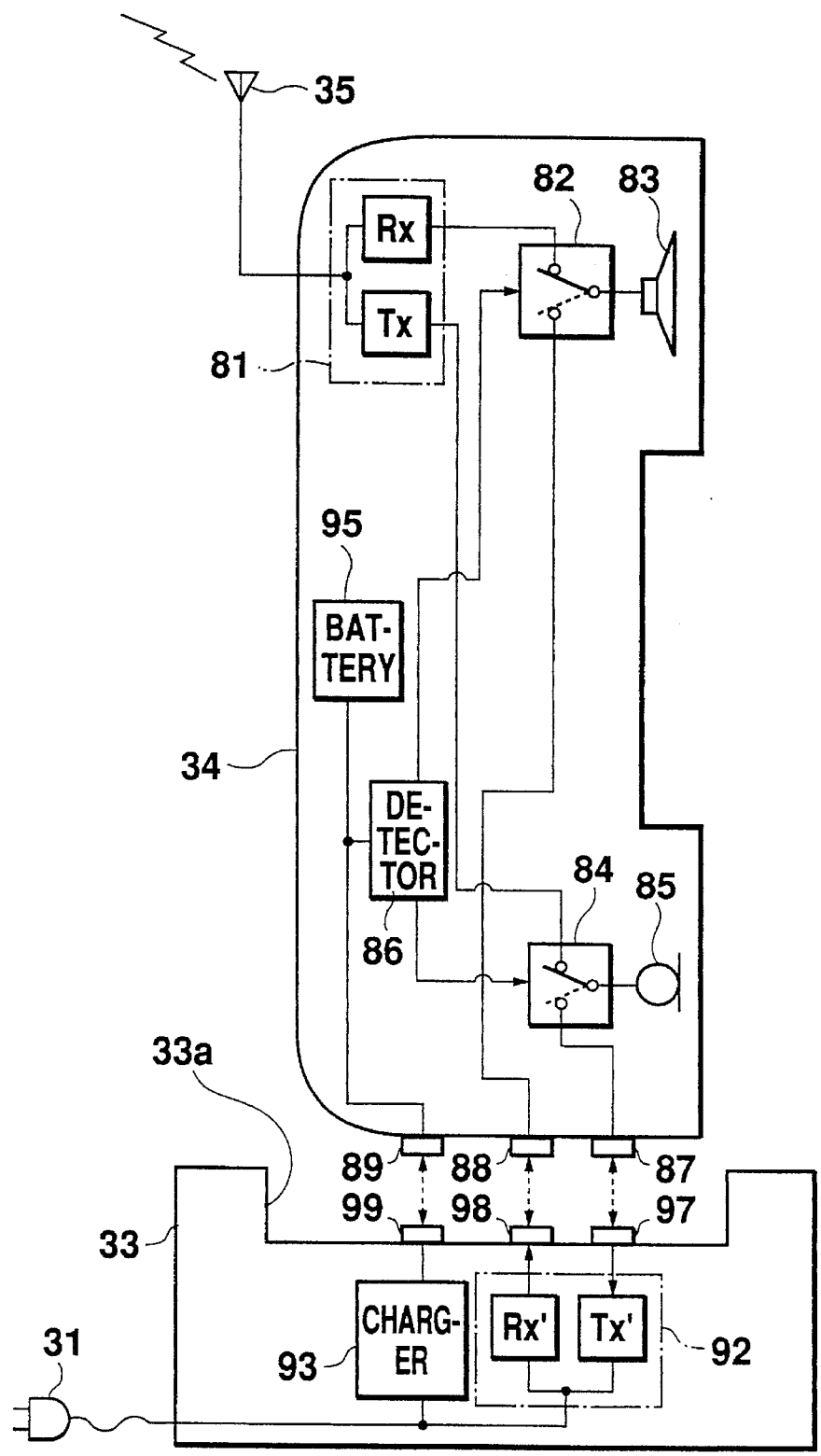
FIG. 3 is a block diagram showing in detail the internal configurations of a branch set and a stand associated therewith of the extension phone type cordless telephone set depicted in FIG. 1.

FIG. 3 depicts in detail the internal configuration of the branch set 34 and the stand 33 associated therewith. The branch set 34 comprises a radio communication circuit 81 for the branch set including a receiving circuit Rx and a transmitting circuit Tx in order to ensure radio communication with the terminating set by way of the antenna 35. The receiving circuit Rx is connected to one change-over contact of a first switching unit 82 whose common contact is coupled to a speaker 83, whereas the transmitting circuit Tx is connected to one change-over contact of a second switching unit 84 whose common contact is coupled to a microphone 85. The other change-over contacts of the first 82 and second 84 switching units are connected to external contacts 88 and 87, respectively, externally provided on the branch set body.

The branch set 34 is provided with a battery 95 acting as a direct current power source and connected to an external contact 89. Further connected to the external contact 89 is a connection detector 86 for detecting whether the branch set 34 rests on the stand 33 or not. In other words, the first 82 and second 84 switching units serve as circuit change-over means which can change over the circuit in compliance with the detection results of the connection detector 86. This will also feature the present invention.

On the other hand, the stand 33 comprises a wire communication circuit 92 for the stand including a receiving circuit Rx' and a transmitting circuit Tx', as well as a charger 93. The wire communication circuit 92 and charger 93 are both connected to the outlet 32 of the interior wire 11 (FIG. 1) by way of the power code plug 31, which will also characterize the present invention. The receiving circuit Rx' and the transmitting circuit Tx' are coupled to contacts 98 and 97, respectively, the charger 93 being coupled to a contact 99. Formed on the top surface of the stand 33 is a branch set mount 33a bearing the branch set 34 thereon. The contacts 97, 98, and 99 are arranged on the branch set mount 33a so as to correspond to the external contacts 87, 88, and 89, respectively, provided on the branch set 34. It is to be appreciated that the above configurations apply to the other branch set 24 and the stand 23 associated therewith.

Operation will now be explained.

Assume that the branch set 24 is now in service for an outside line call by way of the terminating set 12, as indicated by the dotted line 41 of FIG. 1. Under these conditions, the radio communication circuit 71 of the terminating set 12 (FIG. 2) is occupied by the radio communication with the branch set 24 so that the other branch set 34 is prevented from having an extension call with the terminating set 12 as long as the former is dismounted from the stand 33.

Now, upon mounting the branch set 34 onto the stand 33, the external contacts 87 to 89 of the branch set 34 are correspondingly coupled to the contacts 97 to 99 of the stand 33, with the result that the charger 93 applies a direct current voltage to the external contact 89. This is detected by the connection detector 86 of the branch set 34 which in turn transmits signals to the first switching unit 82 and the second switching unit 84. This will allow the first 82 and second 84 switching units to be changed over from the side (indicated by solid lines in the diagram) associated with the receiving circuit Rx and the transmitting circuit Tx, respectively, of the radio communication circuit 81 for the branch set to the side (indicated by broken lines in the diagram) associated with the external contacts 88 and 87, respectively, whereby the branch set 34 establishes a connection with the wire communication circuit 92 of the stand 33. Once a predetermined operation such as the input of an identification number is carried out through the keyboard 54 of the terminating set 12 under these conditions, for example, a branch set call signal derived from the transmitting circuit Tx' of the wire communication circuit 72 for the terminating set is sent, in the form of a high-frequency signal superposed on the alternating voltage of the interior wire 11, to the receiving circuit Rx' of the wire communication circuit 92 of the stand 33. Then, the call signal passes through the contact 98, the external contact 88, and the first switching unit 82, and is finally output as a ringing tone from the speaker 83. Thus, an extension call between the terminating set 12 and the branch set 34 is established.

The same sequence will be effected also in the case of an extension call from the branch set 34 to the terminating set 12. In this case, a calling button not shown of the branch set 34 can be depressed to call the terminating set 12 for the extension service.

The above description has been given of the case where when one branch set 24 is in service for an outside line call, an extension call is effected between the other branch set 34 and the terminating set 12. On the contrary, when one branch set is in the process of an extension call with the terminating set 12, the other branch set 34 may be mounted on the stand 33 to enable the branch set 34 to call an outside line by use of the wire communication through the interior wire 11, thus accomplishing an outside line call. Also in the case where the terminating set itself is in service for an outside line call or where an extension call is effected between the terminating set and the branch set, it is possible to effect a wire communication between the other two branch sets, without being limited to the communication between the terminating set and the branch set.

In the above embodiment, it is detected that one branch set has been mounted on the stand to automatically change over from the radio communication mode to the wire communication mode. Naturally, without being limited to this, a manually operated switch, by way of example, may be provided so that the user who has placed the branch set on the stand can change over the mode.

Figure 4:
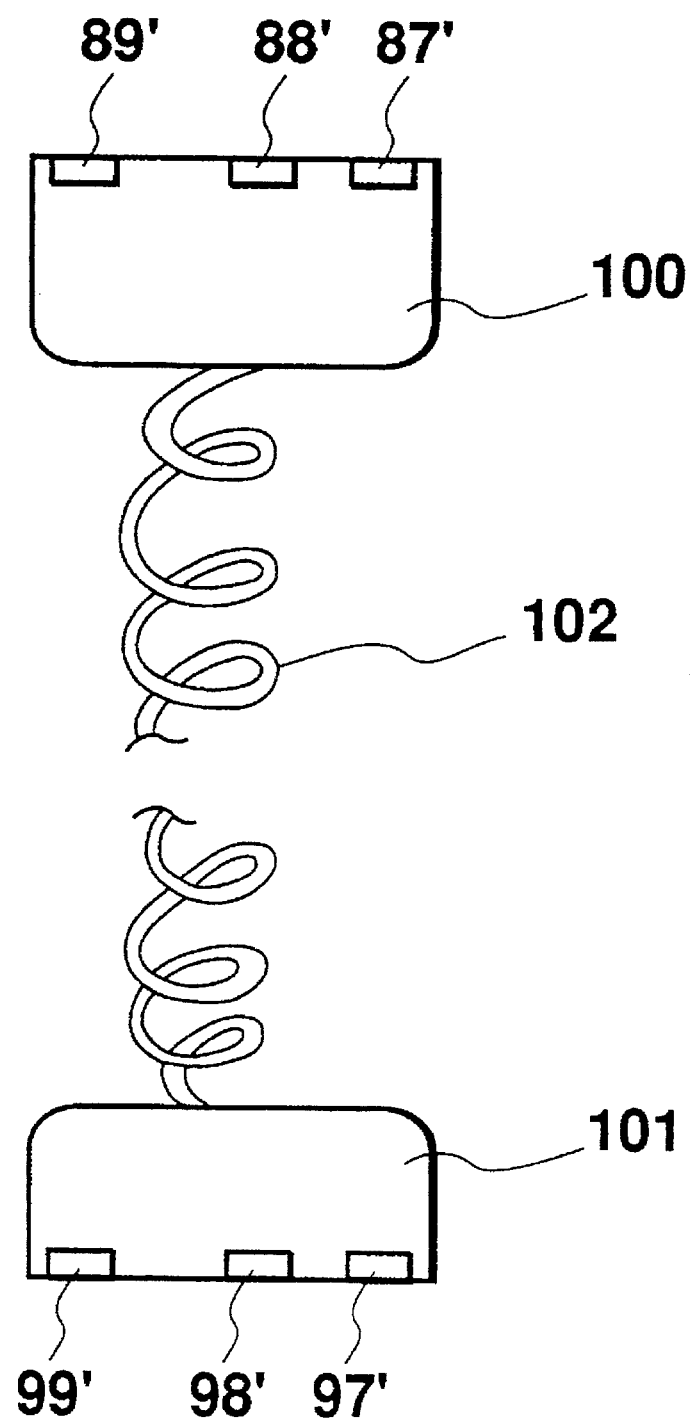
FIG. 4 is a schematic view of a connector cord for connecting together the branch set and the stand depicted in FIG. 3.

Although the branch set 34 is mounted on the branch set mount 33a of the stand 33 for connection in the above embodiment, the branch set 34 may be connected to the stand 33 by use of, for example, a connector cable consisting of connectors 100 and 101 and a curly cord 102 joining the two connectors together as shown in FIG. 4. This will enable the branch set to be used like a receiver of a typical telephone set with a cord, thus resulting in an improved operability as compared with the case of having a conversation through the branch set 34 resting on the stand 33.

The connector 100 includes connector contacts 87', 88', and 89' corresponding to the external contacts 87, 88, and 89 of the branch set 34, while the connector 101 includes connector contacts 97', 98', and 99' corresponding to the contacts 97, 98, and 99 of the stand 33. To facilitate the connection or disconnection between the connector 100 and the branch set 34, and between the connector 101 and the stand 33, their respective connecting portions may be comprised of magnets not shown in order to effect the connection by a magnetic force, or alternatively, may be comprised of the combination of a concave part and a convex part.

In this manner, the cordless telephone set of this embodiment possesses not only a radio communication function but also a wire communication function through a commercial power line such as a interior wire, thereby realizing a simultaneous communication by use of a plurality of branch sets. Furthermore, since the communication through a interior wire is generally supposed to be permitted only within the same pole transformer, a wiretapping can be effectively prevented during the wire communication mode, which may be intentionally used as an anti-wiretapping mode.

What is claimed is:

1. An extension phone cordless telephone comprising:
   a terminating set operative from power supplied from a commercial power line;
   a plurality of branch sets, each branch set including an associated stand, said stand operating using power from said commercial power line;
   said terminating set including:
      a terminating set radio communication circuit including a radio transceiver operating to effect radio communication with one of said branch sets; and
      a terminating set wire communication circuit including a wire line communication transceiver operating to effect wire communication with one of said branch sets using a signal superimposed on said commercial power line;
   each stand including:
      a branch set connecting portion for transmitting and receiving at least a transmission/reception signal and a control signal to and from said branch sets; and
      a stand wire communication circuit including a wire line communication transceiver operating to effect communication using a signal superimposed on said commercial power line with said terminating set wire communication circuit;
   each of said plurality of branch sets including:
      a branch set communication circuit, including a radio communication circuit operating to communicate with said radio transceiver in said terminating set via wireless communications;
      a stand connecting portion for connecting with said stand; and
      a communication controller, controlling said stand wire communication circuit and said branch set communication circuit, such that only one branch set can communicate via wireless communications with said terminating set, and another branch set can communicate via said wire communications with said terminating set while said one branch set is communicating via wireless communications.

2. An extension phone type cordless telephone according to claim 1, wherein
   each of said branch sets further includes:
      a connection detector for detecting whether said branch set has been mounted on said stand associated therewith; and
      a circuit switching means for changing over, based on the detection result of said connection detector, between a communication path through said branch set radio communication path through said stand wire communication circuit within said stand.

3. An extension phone type cordless telephone according to claim 1, wherein
   said stand includes a branch set mount, and wherein
   said branch set is mounted on said branch set mount of said stand for directly connecting between said branch set connecting portion and said stand connecting portion.

4. An extension phone type cordless telephone according to claim 2, wherein
   said stand includes a branch set mount, and wherein
   said branch set is mounted on said mount of said stand for the direct connection between said branch set connecting portion and said stand connecting portion.

5. An extension phone type cordless telephone according to claim 1, wherein
   said branch set connecting portion is connected to said stand connecting portion by way of a connector cable having a connector.

6. An extension phone type cordless telephone according to claim 2, wherein
   said branch set connecting portion is connected to said stand connecting portion by way of a connector cable having a connector.

* * * * *